(12) United States Patent
Wheeler

(10) Patent No.: US 6,371,088 B1
(45) Date of Patent: Apr. 16, 2002

(54) SELF-RELIEVING FUEL FILTER ASSEMBLY

(75) Inventor: Tony Joe Wheeler, Anderson, SC (US)

(73) Assignee: Robert Bosch Corporation, Broadview, IL (US)

( * ) Notice: Subject to any disclaimer, the term of this patent is extended or adjusted under 35 U.S.C. 154(b) by 0 days.

(21) Appl. No.: 09/598,809

(22) Filed: Jun. 21, 2000

(51) Int. Cl.⁷ .............................................. F02M 37/04
(52) U.S. Cl. ...................................... 123/514; 123/510
(58) Field of Search ................................ 123/514, 510, 123/198 D, 456, 446, 457

(56) References Cited

U.S. PATENT DOCUMENTS

| | | |
|---|---|---|
| 2,417,082 A | 3/1947 | Mapes et al. |
| 3,709,239 A | 1/1973 | Morck, Jr. |
| 4,279,746 A | 7/1981 | Leutz |
| 4,592,381 A | 6/1986 | Troy |
| 4,734,262 A | 3/1988 | Bagshawe |
| 4,990,247 A | 2/1991 | Vandenberk |
| 5,078,167 A * | 1/1992 | Brandt et al. ................ 123/514 |
| 5,195,494 A * | 3/1993 | Tuckey ......................... 123/514 |
| 5,533,478 A * | 7/1996 | Robinson ..................... 123/510 |
| 5,623,910 A | 4/1997 | Riggle |
| 5,660,537 A | 8/1997 | Thompson |
| 5,692,479 A | 12/1997 | Ford et al. |
| 5,785,078 A | 7/1998 | Burian et al. |
| 5,832,902 A * | 11/1998 | Davies et al. ................ 123/514 |
| 5,960,775 A * | 10/1999 | Tuckey ......................... 123/509 |
| 5,989,413 A * | 11/1999 | Jauss et al. .................. 210/109 |
| 6,155,238 A * | 12/2000 | Briggs et al. ................ 123/509 |
| 6,202,481 B1 * | 3/2001 | Basore ....................... 73/119 A |

* cited by examiner

Primary Examiner—Carl S. Miller
(74) Attorney, Agent, or Firm—Michael Best & Friedrich LLP

(57) ABSTRACT

A fuel system for an internal combustion engine, the fuel system including a fuel tank, a fuel pump communicating with the fuel tank, a fuel manifold downstream of the fuel pump, and a return line downstream of the fuel pump, the return line communicating with the fuel tank. The fuel system also includes a self-relieving fuel filter assembly having a filter member. The self-relieving fuel filter assembly communicates with the return line and is variable between a first state, wherein fuel passes through the return line and the filter member before returning to the fuel tank, and a second state, wherein fuel passes through the return line without passing through the filter member before returning to the fuel tank. The self-relieving fuel filter assembly therefore permits the continuous passage of fuel through the return line even when the filter member becomes plugged.

20 Claims, 3 Drawing Sheets

SELF-RELIEVING FUEL FILTER ASSEMBLY

FIELD OF THE INVENTION

The invention relates to fuel systems for internal combustion engines, and more particularly to filters used in the fuel systems.

BACKGROUND OF THE INVENTION

It is known to utilize filters in fuel systems for internal combustion engines to filter debris from the fuel. Return-type fuel systems have, upstream of the fuel manifold, a filter that filters the fuel before it enters the fuel manifold. Fuel that is not injected into the combustion chamber exits the fuel manifold and returns to the fuel tank via a return line.

Mechanical returnless fuel systems for internal combustion engines are also known. Unlike return-type systems, mechanical returnless fuel systems have return lines either within the fuel tank or just outside the fuel tank. In such systems, fuel is pumped from the fuel pump to a pressure regulator. The pressure regulator directs the proper amount of fuel required by the engine to the fuel manifold for injection into the combustion chambers. On its way to the fuel manifold, the fuel to be used passes through a fuel filter just as with return-type systems. Fuel not needed by the engine is directed by the pressure regulator to a return line which routes the fuel back to the fuel tank.

In the past, fuel passing through the return line of a mechanical returnless fuel system has not been filtered. Recirculation of the unfiltered return fuel was found to decrease the life of the fuel pump and shorten the life of the fuel pump inlet filter due to the debris generated by the wear of internal fuel pump components. As such, fuel system suppliers have begun to add a return line fuel filter in mechanical returnless fuel systems to improve the fuel pump and fuel pump inlet filter durability.

SUMMARY OF THE INVENTION

Adding a fuel filter to the return line of returnless fuel systems has improved the durability of the fuel pump and fuel pump inlet filter, but has caused other problems. Specifically, no provision has been made for handling plugged return filters. If the return filter plugs, the pressure in the fuel system will increase until reaching the fuel pump relief valve setting (typically 5.5–6.5 bar), at which point the fuel pump will shut down and the engine will stop. The driver will not be warned of the upcoming engine shutdown as the engine control computer can compensate for the increased fuel system pressure.

Another problem would occur during engine shutdown/hot soak. During engine shutdown, the hot gasoline inside the engine fuel manifold is normally allowed to expand back through the pressure regulator and into the fuel tank. Since the expanding fuel is not allowed to return through the fuel pump, due to a check valve inside the fuel pump that maintains the prime of the fuel pump during shutdown, the expanding fuel must return via the return line. If the return filter is plugged, the expanding fuel cannot return to the fuel tank and has nowhere to go. The pressure will build until a failure occurs somewhere in the fuel system. This type of failure provides a strong potential for a dangerous external fuel leak.

The present invention alleviates pressure build-up problems in fuel systems by providing a self-relieving fuel filter assembly. The self-relieving fuel filter assembly is preferably positioned in the return line of a returnless fuel system and allows for filtered return flow without the dangerous risks associated with pressure build-up leading to engine shutdown and/or external fuel leaks. Under normal conditions, the self-relieving fuel filter assembly filters the fuel in the return line, thereby improving the life of the fuel pump and fuel pump inlet filter. If the filter plugs however, its self-relieving characteristic enables fuel to pass through unfiltered and return to the fuel tank before dangerously high pressures are reached in the fuel system. Catastrophic failures due to high fuel system pressure are avoided in favor of less dangerous and more gradual system degradation type failures, such as plugged fuel pump inlet filters and worn-out fuel pumps.

More specifically, the invention provides a fuel system for an internal combustion engine, the fuel system including a fuel tank, a fuel pump communicating with the fuel tank, a fuel manifold downstream of the fuel pump, and a return line downstream of the fuel pump, the return line communicating with the fuel tank. The fuel system also includes a self-relieving fuel filter assembly having a filter member. The self-relieving fuel filter assembly communicates with the return line and is variable between a first state, wherein fuel passes through the return line and the filter member before returning to the fuel tank, and a second state, wherein fuel passes through the return line without passing through the filter member before returning to the fuel tank. The self-relieving fuel filter assembly therefore permits the continuous passage of fuel through the return line even when the filter member becomes plugged.

Preferably, the fuel system is a mechanical returnless fuel system having a pressure regulator downstream of the fuel pump and upstream of the return line. The self-relieving fuel filter assembly is variable from the first state to the second state when the fuel pressure in the return line exceeds a predetermined pressure.

In one embodiment, the filter assembly includes a blow-out plate adjacent the filter member. The blow-out plate is alterable from an intact condition, wherein fuel cannot flow through the plate, to a blown-out condition, wherein fuel can flow through the plate. Preferably, the blow-out plate comprises a plastic member having a relatively thin cross-sectional thickness. Additionally, the plastic member can be scored to help initiate the blow out.

In another embodiment, the filter member is in the return line and the self-relieving fuel filter assembly further includes a bypass line having a pressure relief valve that allows fuel to bypass the filter member.

In another embodiment, the self-relieving fuel filter assembly is in effect a pressure relief valve in which the filter member is a movable valve member biased against a valve seat. The assembly thus includes a spring connected to the filter member. The spring biases the filter member against a seat such that the fuel must flow through the filter member when the filter member is seated. The filter member moves off the seat when the filter member is plugged and the fuel pressure in the return line reaches a predetermined pressure. This allows fuel to flow around the filter member.

Other features and advantages of the invention will become apparent to those skilled in the art upon review of the following detailed description, claims, and drawings.

Figure 1:
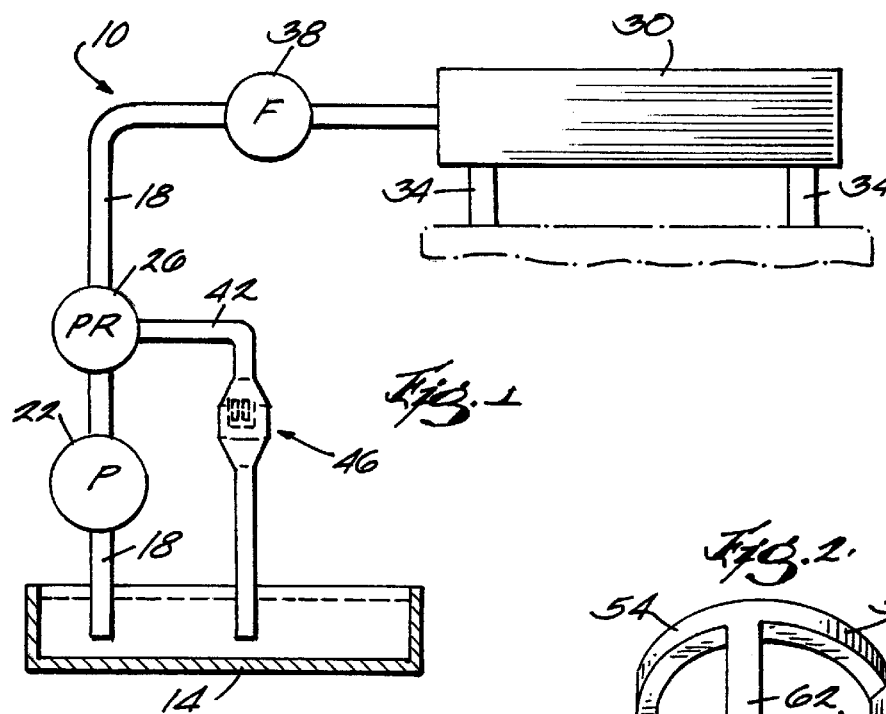
FIG. 1 is a schematic view of a mechanical returnless fuel system embodying the invention and having a self-relieving fuel filter assembly.

Before one embodiment of the invention is explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein is for the purpose of description and should not be regarded as limiting. The use of "including" and "comprising" and variations thereof herein is meant to encompass the items listed thereafter and equivalents thereof as well as additional items.

DETAILED DESCRIPTION OF THE PREFERRED EMBODIMENT

FIG. 1 is a schematic view showing a fuel system 10 embodying the present invention. The fuel system 10 is for an internal combustion engine (not shown). The fuel system 10 has a fuel tank 14, a fuel line 18 communicating with the fuel tank 14 for removing fuel from the tank 14, and a fuel pump 22 communicating with the tank 14 via the fuel line 18. It should be appreciated that the fuel pump 22 can also be located within the fuel tank 14 as is commonly known. Fuel pumped from the tank 14 travels in the fuel line 18 to a pressure regulator 26 that is downstream of the fuel pump 22. The pressure regulator 26 determines the amount of fuel needed by the engine and allows the necessary amount of fuel to continue downstream in the fuel line 18 to a fuel manifold 30. The fuel manifold 30 includes a plurality of fuel injectors 34 and injects fuel into combustion chambers (not shown) as is commonly understood. A fuel filter 38 filters the fuel that enters the manifold 30. Substantially all of the fuel entering the manifold 30 is injected into the combustion chambers, making the fuel system 10 a mechanical returnless fuel system. The components of the fuel system 10 described thus far can be of any suitable construction.

The fuel system 10 also includes a fuel return line 42 communicating with the pressure regulator 26. Fuel not needed for powering the engine is directed by the pressure regulator 26 through the return line 42 and back to the fuel tank 14. The fuel return line 42 can be made of any suitable material, such as metal, plastic, rubber, etc., capable of maintaining integrity in the environment.

Figure 2:
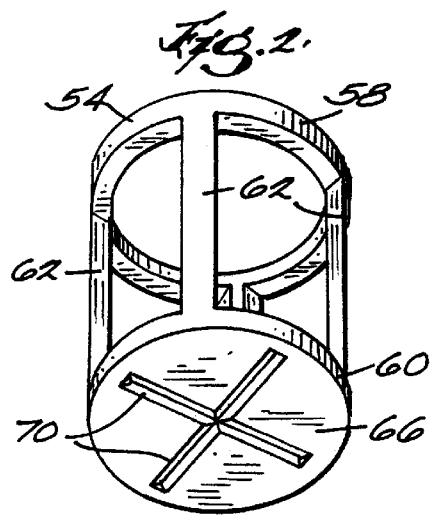
FIG. 2 is a perspective view of a filter housing used in the self-relieving fuel filter assembly of FIG. 1.
Figure 3:
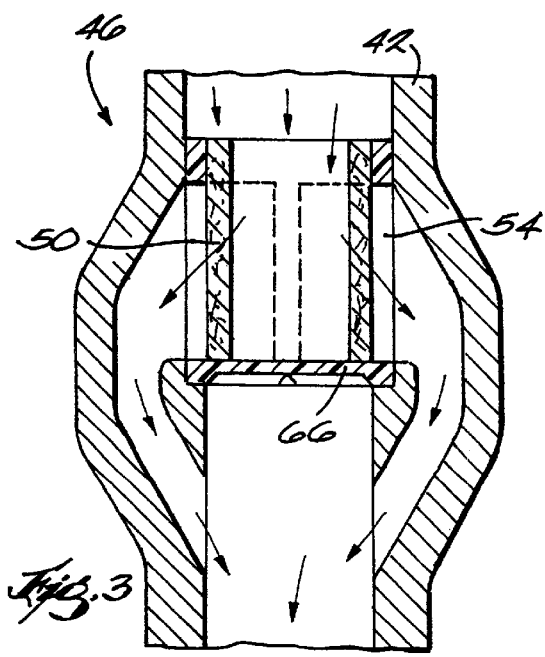
FIG. 3 is an enlarged section view of the self-relieving fuel filter assembly of FIG. 1, with the filter member shown in the filtering position.
Figure 4:
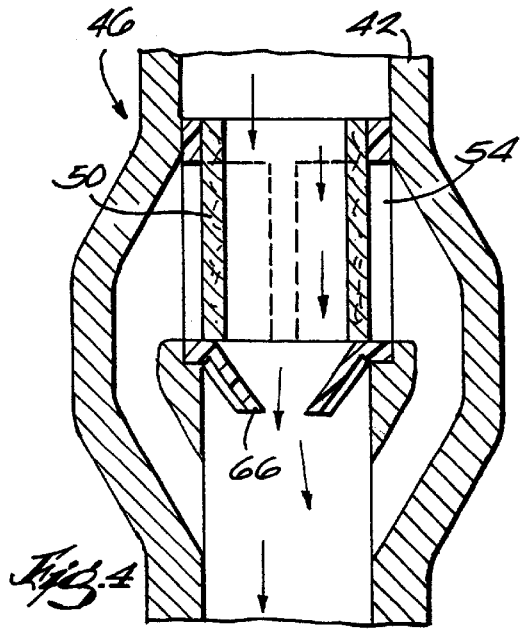
FIG. 4 is an enlarged section view of the self-relieving fuel filter assembly of FIG. 1, with the filter member shown in the non-filtering position.

As seen in FIGS. 1, 3 and 4, the fuel system 10 further includes a self-relieving fuel filter assembly 46 in the return line 42. The self-relieving fuel filter assembly 46 includes (see FIGS. 3 and 4) a filter member 50 housed or retained in a filter housing 54. As best seen in FIG. 2, the filter housing 54 is a substantially cylindrical frame having an annular end portion 58 connected to a disk-shaped end portion 60 by rib portions 62. The annular end portion 58 is open. The end portion 60 includes a blow-out plate or sheet portion 66. The filter housing 54 is preferably plastic, but could be metallic as well. The blow-out plate 66 is preferably a plastic member having a relatively thin cross-sectional thickness. Alternatively, the blow-out plate could be metallic. As seen in FIG. 2, the blow-out plate 66 can have score lines 70 for reasons that will be described below.

As seen in FIGS. 3 and 4, the filter member 50 is tubular with two open ends, and is coaxial with the filter housing 54 such that fuel entering the open annular end 58 must pass radially outward through the filter member 50 between the rib portions 62. It should be noted that the filter member 50 could have a thicker wall than shown in FIGS. 3 and 4 in order to fill more of the interior space of the filter housing 54.

The self-relieving fuel filter assembly 46 is located in an enlarged portion of the return line 42, with the open annular end 58 upstream of the end 60 having the blow-out plate 66. The self-relieving fuel filter assembly 46 is variable between (see FIG. 3) a first state, wherein fuel passing through the return line 42 passes through the filter member 50 before returning to the fuel tank 14, and (see FIG. 4) a second state, wherein fuel passing through the return line 42 does not pass through the filter member 50 before returning to the fuel tank 14.

While operating in the first state, fuel travels substantially along the path shown by the arrows in FIG. 3. The fuel enters the open annular end 58 and passes radially outward through the filter member 50. The expanded portion of the return line 42 allows fuel to flow around the seated end 60 of the filter housing 54 and back to the fuel tank 14. While operating in the first state, the blow-out plate 66 is in an intact condition, thereby directing the fuel to exit the filter housing 54 through the filter member 50, and substantially preventing the fuel from exiting through the closed end 60 of the filter housing 54. During first-state operation, foreign particles and debris in the fuel will be filtered out by the filter member 50 so that substantially clean fuel will return to the tank 14.

As the filter member 50 filters debris from the fuel, the collected debris may begin to block the flow of fuel through the filter member 50. Eventually, the partially or completely blocked filter member 50 will hinder the flow of fuel such that the fuel pressure in the return line 42 will begin to increase. When the fuel pressure in the return line 42 reaches or exceeds a predetermined pressure, the higher fuel pressure will break the blow-out plate 66 as shown in FIG. 4. The thickness of the blow-out plate 66 can be selected to blow out at any desired predetermined fuel pressure, and (see FIG. 2) the score lines 70 can be sized and configured to provide the starting point and the desired failure mode for the blow out.

Once the blow-out plate opens, the self-relieving fuel filter assembly 46 operates (see FIG. 4) in the second state. While operating in the second state, fuel travels substantially along the path shown by the arrows in FIG. 4. The fuel enters the open annular end 58, passes axially through the filter member 50 and exits through the blown-out plate 66, into the return line 42, and back to the fuel tank 14. While some of the fuel may still pass through the filter member 50, much of the fuel takes the path of least resistance and is not filtered before returning to the fuel tank 14.

The transformation of the blow-out plate to the blown-out condition, and the subsequent change from first-state operation to second-state operation of the self-relieving fuel filter assembly 46, relieves the pressure buildup in the return line 42 caused by the partially or completely plugged filter member 50. The self-relieving fuel filter assembly 46 therefore permits continuous passage of fuel through the return line 42 when the filter member 50 becomes plugged, and substantially prevents engine shutdown and/or external fuel leaks commonly associated with fuel pressure buildup due to plugged return line filters.

Figure 5:
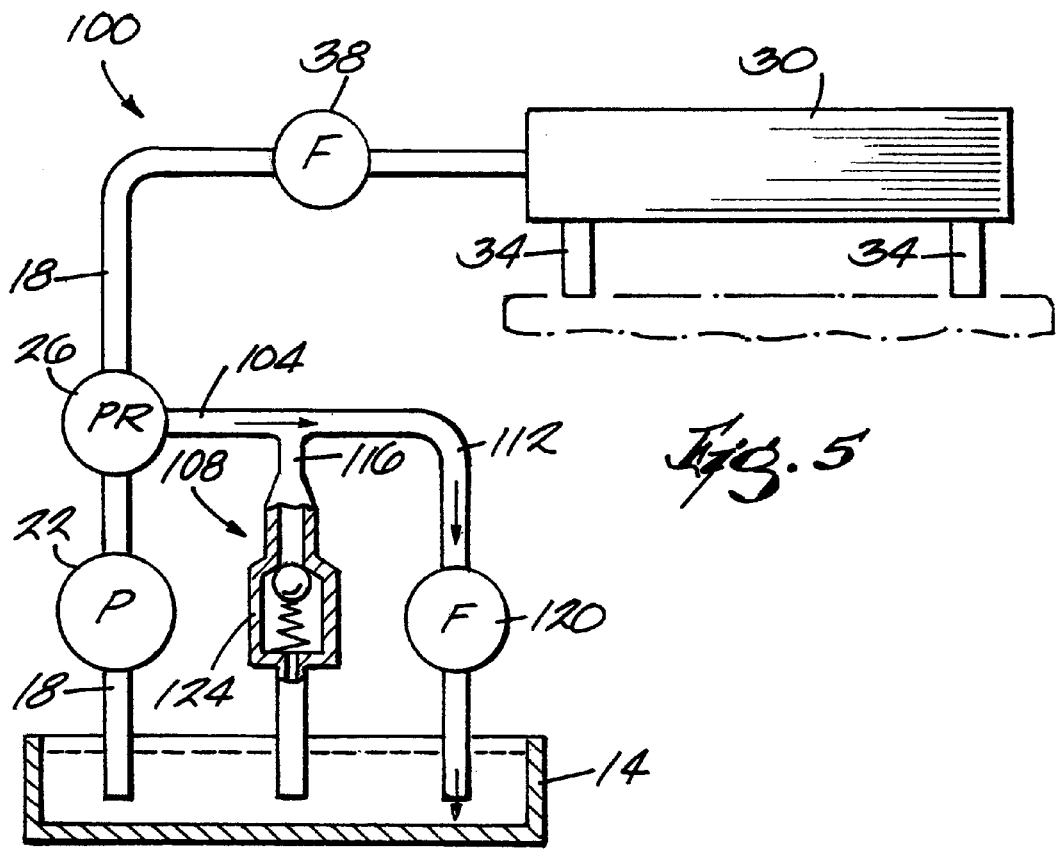
FIG. 5 is a schematic view of another mechanical returnless fuel system having an alternative self-relieving fuel filter assembly with the filter member shown in the filtering position.
Figure 6:
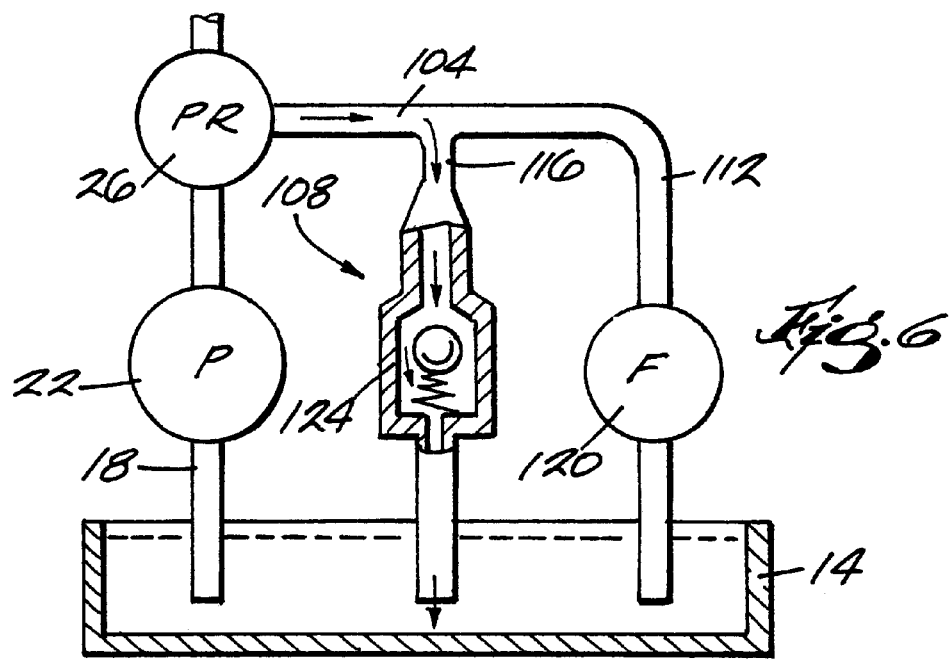
FIG. 6 is an enlarged section view of the self-relieving fuel filter assembly of FIG. 5, with the filter member shown in the non-filtering position.

FIGS. 5 and 6 are schematic views showing another mechanical returnless fuel system 100 embodying the present invention. The fuel system 100 is similar to the fuel system 10 of FIG. 1, with like parts having like reference numerals. The fuel system 100 operates in substantially the same manner as the fuel system 10 with regard to supplying fuel to the fuel manifold 30, however, the fuel system 100 includes an alternative return line 104 and an alternative self-relieving fuel filter assembly 108. The return line 104 has a first or main line 112 and a second or bypass line 116. The lines 112, 116 are in parallel with one another and each line communicates at one end with the pressure regulator 26, and at the other end with the fuel tank 14.

The main line 112 includes a fuel filter member 120 that filters fuel passing through the main line 112 before the fuel reaches the tank 14. The filter member 120 can be of any suitable construction. The bypass line 116 includes a pressure relief valve 124. The pressure relief valve can also be of any suitable construction.

It is important to note that the main line 112 and the bypass line 116 need not be configured or oriented as shown in FIGS. 5 and 6, but rather can be configured in any suitable manner to allow fuel to bypass the filter member 120. For example, the main line 112 and the bypass line 116 could be transposed from the orientation shown in FIGS. 5 and 6 such that fuel travelling from the pressure regulator 26 reaches the main line 112 before reaching the bypass line 116. Alternatively, the bypass line 116 can simply branch off the main line 112 upstream of the filter member 120, bypass the filter member 120, and rejoin the main line 112 upstream of the fuel tank 14.

The self-relieving fuel filter assembly 108 is variable between (see FIG. 5) a first state, wherein fuel passing through the return line 104 passes through the main line 112 and the filter member 120 before returning to the fuel tank 14, and (see FIG. 6) a second state, wherein fuel passing through the return line 104 does not pass through the filter member 120 before returning to the fuel tank 14, but rather passes through the bypass line 116 and the pressure relief valve 124 before entering the tank 14.

While operating in the first state, fuel travels substantially along the path shown by the arrows in FIG. 5. The pressure relief valve 124 is closed such that the fuel must travel through the main line 112, through the filter member 120 and into the tank 14. During first-state operation, foreign particles and debris in the fuel will be filtered out by the filter member 120 so that substantially clean fuel will return to the tank 14.

As the filter member 120 becomes plugged, the fuel pressure in the return line 104 will begin to increase. When the fuel pressure in the return line 104 reaches or exceeds a predetermined pressure, the higher fuel pressure will cause (see FIG. 6) the pressure relief valve 124 to open, allowing fuel in the bypass line 116 to pass through the pressure relief valve 124 and enter the tank 14. The pressure relief valve 124 can be selected and/or adjusted to open at any desired predetermined fuel pressure.

Figure 7:
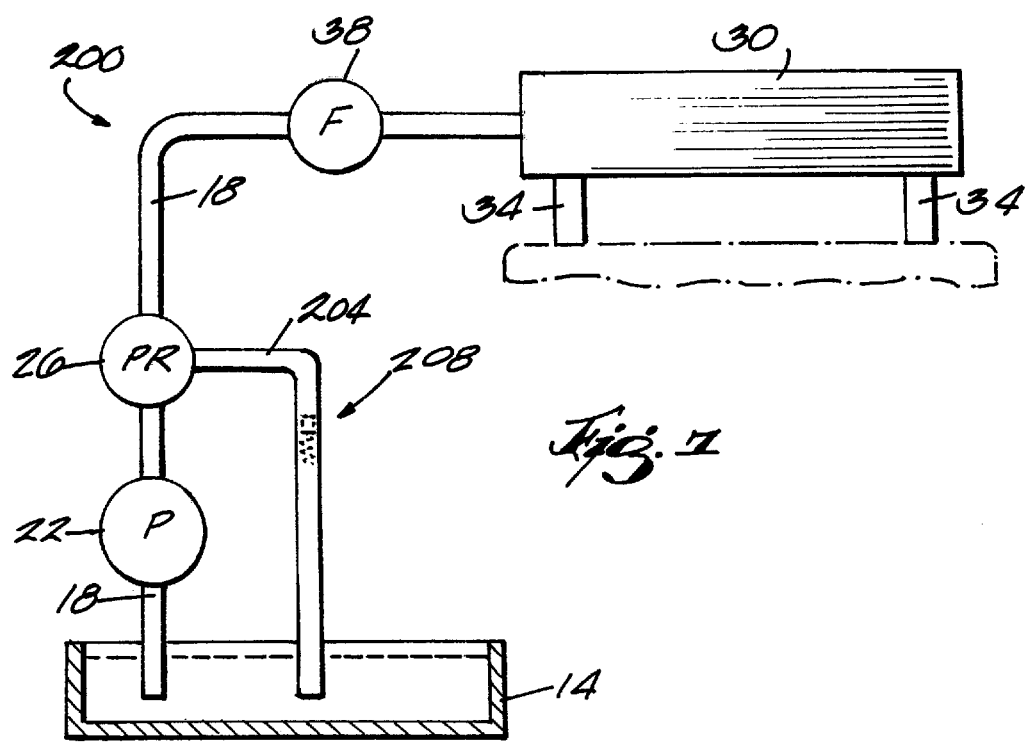
FIG. 7 is a schematic view of yet another mechanical returnless fuel system having yet another alternative self-relieving fuel filter assembly embodying the invention.

FIG. 7 is schematic view showing yet another mechanical returnless fuel system 200 embodying the present invention. The fuel system 200 is similar to the fuel system 10 of FIG. 1, with like parts having like reference numerals. The fuel system 200 operates in substantially the same manner as the fuel system 10 with regard to supplying fuel to the fuel manifold 30, however, the fuel system 200 includes an alternative return line 204 and an alternative self-relieving fuel filter assembly 208.

Figures 8, 9:
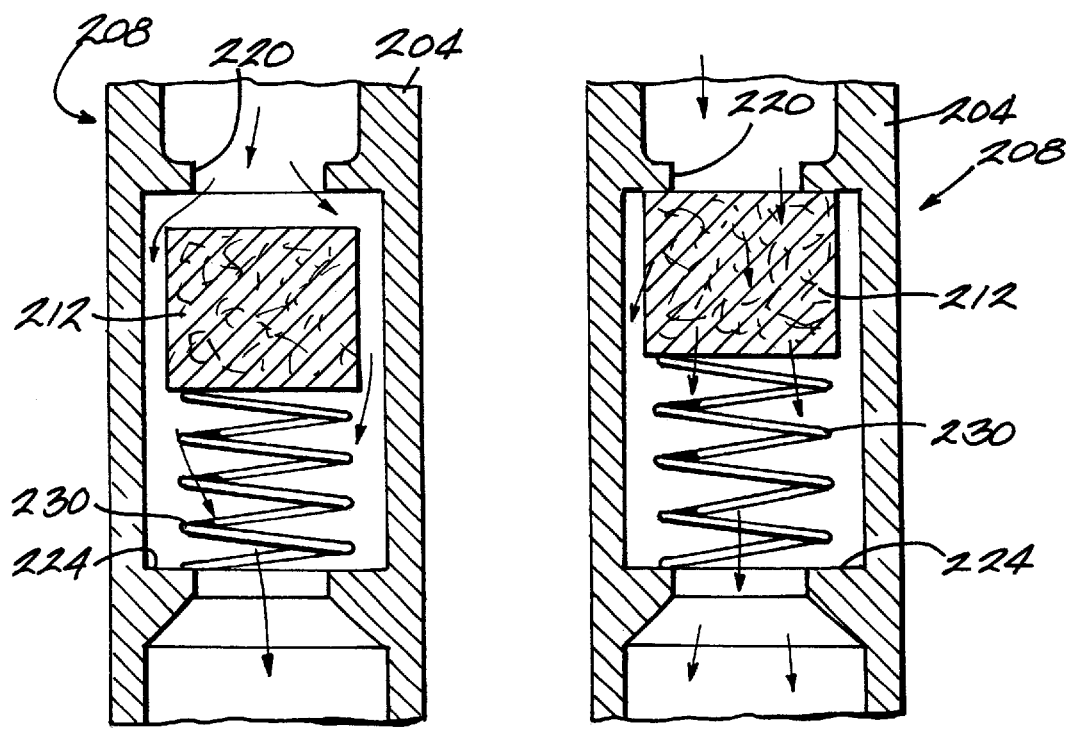
FIG. 8 is an enlarged section view of the self-relieving fuel filter assembly of FIG. 7, with the filter member shown in the filtering position.
FIG. 9 is an enlarged section view of the self-relieving fuel filter assembly of FIG. 7, with the filter member shown in the non-filtering position.

As seen in FIGS. 7–9, the fuel system 200 includes a self-relieving fuel filter assembly 208 communicating with the return line 204. In the preferred embodiment, the self-relieving fuel filter assembly 208 is in the return line 204 and includes (see FIGS. 8 and 9) a filter member or cartridge 212. The filter cartridge 212 can be of any suitable construction and need not be configured as shown in FIGS. 7 and 8. For example, the filter cartridge 212 can be a relatively thin filter membrane retained in a frame. The filter cartridge 212 can be any desired shape or size.

The self-relieving fuel filter assembly 208 is located in a portion of the return line 204 having a reduced diameter valve seat portion 220 and a spring seat portion 224. The filter cartridge 212 is removably seated against the valve seat portion 220 as will be described below. A spring 230 is coupled to the filter cartridge 212 in any suitable manner while the free end of the spring 230 is seated against the spring seat portion 224 such that the spring 230 biases the filter cartridge 212 against the valve seat portion 220. It is important to note that the return line 204, and more specifically the valve seat portion 220 and the spring seat portion 224, need not be configured as shown in FIGS. 8 and 9, but rather could be configured in any suitable manner that achieves the outcome described below.

The self-relieving fuel filter assembly 208 is variable between (see FIG. 8) a first state, wherein fuel passing through the return line 204 passes through the filter cartridge 212 before returning to the fuel tank 14, and (see FIG. 9) a second state, wherein fuel passing through the return line 204 does not pass through the filter cartridge 212 before returning to the fuel tank 14.

While operating in the first state, fuel travels substantially along the path shown by the arrows in FIG. 8. The fuel enters the valve seat portion 220 and passes through the filter cartridge 212. The fuel then flows past the spring 230 and the spring seat 224 and back to the fuel tank 14. While operating in the first state, the spring 230 biases the filter cartridge 212 against the valve seat 220 such that the fuel must pass through the filter cartridge 212.

As the filter cartridge 212 becomes clogged, the fuel pressure in the return line 204 will begin to increase. When the fuel pressure in the return line 204 reaches or exceeds a predetermined pressure, the higher fuel pressure acting against the filter cartridge 212 will overcome the force of the spring 230 such that the filter cartridge will become unseated and move to the position shown in FIG. 9. The spring 230 can be selected to have a spring force capable of being overcome by any desired predetermined fuel pressure.

While all of the figures illustrate the use of the self-relieving fuel filter assemblies in a returnless fuel system, it is important to note that the self-relieving fuel filter assemblies of the present invention could also be used in the return line of a return-type system.

Various features of the invention are set forth in the following claims.

What is claimed is:

1. A fuel system for an internal combustion engine, the fuel system comprising:
   a fuel tank;
   a fuel pump communicating with the fuel tank;
   a fuel manifold downstream of the fuel pump;
   a return line downstream of the fuel pump, the return line communicating with the fuel tank; and
   a self-relieving fuel filter assembly having a filter member, the self-relieving fuel filter assembly communicating with the return line and being variable between a first state, wherein fuel passes through the return line and the filter member before returning to the fuel tank, and a second state, wherein fuel passes through the return line without passing through the filter member before returning to the fuel tank, thereby permitting the continuous passage of fuel through the return line even when the filter member becomes plugged.

2. The fuel system of claim 1, wherein the fuel system is a mechanical returnless fuel system having a pressure regulator downstream of the fuel pump and upstream of the fuel manifold and the return line.

3. The fuel system of claim 2, wherein the self-relieving fuel filter assembly is variable from the first state to the second state when the fuel pressure in the return line exceeds a predetermined pressure.

4. The fuel system of claim 2, wherein the self-relieving fuel filter assembly further includes a blow-out plate adjacent the filter member, the blow-out plate being alterable from an intact condition, wherein the fuel filter assembly is in the first state, to a blown-out condition, wherein the fuel filter assembly is in the second state.

5. The fuel system of claim 4, wherein the blow-out plate is alterable from the intact condition to the blown-out condition when the fuel pressure in the return line reaches a predetermined pressure.

6. The fuel system of claim 5, wherein the blow-out plate comprises a plastic member having a relatively thin cross-sectional thickness.

7. The fuel system of claim 6, wherein the plastic member is scored.

8. The fuel system of claim 2, wherein the filter member is in the return line and wherein the self-relieving fuel filter assembly further includes
   a bypass line communicating between a portion of the return line and the fuel tank; and
   a pressure relief valve in the bypass line.

9. The fuel system of claim 2, wherein the self-relieving fuel filter assembly further includes a spring connected to the filter member and operable to permit movement of the filter member from a first position, wherein the fuel filter assembly is in the first state, to a second position, wherein the fuel filter assembly is in the second state.

10. The fuel system of claim 9, wherein the filter member is movable from the first position to the second position when the fuel pressure in the return line reaches a predetermined pressure.

11. The fuel system of claim 9, wherein the spring biases the filter member against a seat such that the fuel must flow through the filter member when the filter member is seated, and wherein the filter member moves off the seat when the fuel pressure in the return line reaches a predetermined pressure, such that fuel can flow around the filter member.

12. A mechanical returnless fuel system for an internal combustion engine, the fuel system comprising:
   a fuel tank;
   a fuel pump communicating with the fuel tank;
   a fuel manifold;
   a return line having a downstream end communicating with the fuel tank;
   a pressure regulator downstream of the fuel pump, the pressure regulator directing a portion of the fuel from the fuel pump to the manifold and a portion of the fuel from the fuel pump to the return line; and
   a self-relieving fuel filter assembly having a filter member, the self-relieving fuel filter assembly communicating with the return line and being variable between a first state, wherein fuel passes through the return line and the filter member before returning to the fuel tank, and a second state, wherein fuel passes through the return line without passing through the filter member in the event the filter member becomes plugged.

13. The fuel system of claim 12, wherein the filter member is in the return line and wherein the self-relieving fuel filter assembly further includes
   a bypass line communicating between a portion of the return line and the fuel tank; and
   a pressure relief valve in the bypass line.

14. The fuel system of claim 12, wherein the self-relieving fuel filter assembly further includes a spring connected to the filter member and operable to permit movement of the filter member from a first position, wherein the fuel filter assembly is in the first state, to a second position, wherein the fuel filter assembly is in the second state.

15. The fuel system of claim 14, wherein the filter member is movable from the first position to the second position when the fuel pressure in the return line reaches a predetermined pressure.

16. The fuel system of claim 14, wherein the spring biases the filter member against a seat such that the fuel must flow through the filter member when the filter member is seated, and wherein the filter member moves off the seat when the fuel pressure in the return line reaches a predetermined pressure, such that fuel can flow around the filter member.

17. A mechanical returnless fuel system for an internal combustion engine, the fuel system comprising:
   a fuel tank;
   a fuel pump communicating with the fuel tank;
   a pressure regulator downstream of the fuel pump;
   a fuel manifold downstream of the pressure regulator;
   a return line communicating with the pressure regulator and having a downstream end communicating with the fuel tank; and
   a self-relieving fuel filter assembly communicating with the return line and the self-relieving fuel filter assembly including a filter member and a blow-out plate adjacent the filter member, the blow-out plate being alterable from an intact condition, wherein fuel passes through the return line and the filter member before returning to the fuel tank, to a blown-out condition, wherein fuel passes through the return line without passing through the filter member in the event the filter member becomes plugged.

18. The fuel system of claim 17, wherein the blow-out plate is alterable from the intact condition to the blown-out condition when the fuel pressure in the return line reaches a predetermined pressure.

19. The fuel system of claim 17, wherein the blow-out plate comprises a plastic member having a relatively thin cross-sectional thickness.

20. The fuel system of claim 19, wherein the plastic member is scored.

* * * * *